(12) United States Patent
Maeda

(10) Patent No.: US 6,836,297 B2
(45) Date of Patent: *Dec. 28, 2004

(54) VIDEO SIGNAL SELECTING DEVICE

(75) Inventor: Osamu Maeda, Osaka (JP)

(73) Assignee: Funai Electric Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/220,491

(22) Filed: Dec. 24, 1998

(65) Prior Publication Data

US 2002/0047927 A1 Apr. 25, 2002

(30) Foreign Application Priority Data

Dec. 26, 1997 (JP) .............................................. 9-011322

(51) Int. Cl.⁷ ................................................. H04N 5/50
(52) U.S. Cl. ....................... 348/569; 348/554; 348/584; 348/589
(58) Field of Search ................................ 348/568, 705, 348/706, 569, 570, 554, 584, 589, 600

(56) References Cited

U.S. PATENT DOCUMENTS

| | | | | |
|---|---|---|---|---|
| 4,405,946 A | | 9/1983 | Knight | 348/554 |
| 4,430,671 A | * | 2/1984 | Tamer | 348/570 |
| 4,996,597 A | * | 2/1991 | Duffield | 348/705 |
| 5,251,015 A | * | 10/1993 | Rumreich | 348/568 |
| 5,452,023 A | * | 9/1995 | Kim | 348/731 |
| 5,608,425 A | * | 3/1997 | Movshovich | 345/141 |
| 5,786,845 A | * | 7/1998 | Tsuria | 725/32 |
| 5,808,693 A | * | 9/1998 | Yamashita et al. | 348/554 |
| 5,815,088 A | * | 9/1998 | Kurtz | 348/705 |
| 5,822,018 A | * | 10/1998 | Farmer | 348/705 |
| 5,914,757 A | * | 6/1999 | Dean et al. | 348/584 |
| 5,917,557 A | * | 6/1999 | Toyoda | 348/705 |
| 5,995,160 A | * | 11/1999 | Rumreich | 348/564 |
| 6,011,594 A | * | 1/2000 | Takashima | 348/705 |
| 6,014,178 A | * | 1/2000 | Jeon et al. | 348/554 |
| 6,091,459 A | * | 7/2000 | Masaike | 348/569 |

FOREIGN PATENT DOCUMENTS

| | | |
|---|---|---|
| JP | 3-58681 A | 3/1991 |
| JP | 3-58681 A | 3/1993 |
| JP | 5-16108 A | 6/1993 |
| JP | 5-34433 A | 12/1993 |

OTHER PUBLICATIONS

Hei2–21868 Japan Unexamined Japanese Utility Model Publication with X/O English translation, Abstract is provided.

* cited by examiner

Primary Examiner—Michael H. Lee
Assistant Examiner—Trang U. Tran
(74) Attorney, Agent, or Firm—Myron Greenspan; Lackenbach Siegel, LLP

(57) ABSTRACT

A video signal selecting device for selectively outputting one of a plurality of input video signals to a video display apparatus in accordance with an instruction input is disclosed. The selecting device comprises a selector for selectively outputting one signal of the plural video signals, an OSD control section for displaying symbol information on uniformly colored background indicating that the selective output is executed on a screen of the video display apparatus, and a control circuit section for controlling the selective output of the selector in accordance with the instruction input, and for detecting a change of the instruction input to start up the OSD control section.

6 Claims, 2 Drawing Sheets

VIDEO SIGNAL SELECTING DEVICE

BACKGROUND OF THE INVENTION

The present invention relates to a video signal selecting device for use with a video apparatus, a television receiver or the like, in which a plurality of external input terminals are provided, the video signal selecting device being capable of selecting a desired video signal from among video signals applied thereto in accordance with an instruction externally applied.

The video apparatus is provided with external input terminals, that is, a video input terminal and an antenna input terminal. Selection of those input terminals is externally made by use of a remote control unit. An external input switching device disposed in a video apparatus, which corresponds to the video signal selecting device, is known as disclosed in U.S. Pat. No. 4,405,946, for example.

In the disclosed video apparatus, an instruction to select or designate a desired broadcasting wave arriving at the antenna input terminal is generated by use of a remote control unit; the broadcasting signal of the selected channel is input to the video apparatus; and a character of a channel number is displayed, in a superimposing fashion, on the screen of a television receiver (TV set) coupled to the antenna output terminal of the video apparatus. When the television signal of the selected channel is not input to the video apparatus, such a superimposing display is not performed.

In the disclosed video apparatus, the channel number is displayed in a superimposing fashion on the display screen. In some contents of display, the channel number displayed is illegible. Furthermore, when the television signal of the selected channel is not input to the video apparatus, the superimposing display is not presented as described the above. Therefore, the user cannot recognize whether or not the channel select is actually made. In this respect, the handling of the video apparatus is not good. There are many forms of television broadcastings, for example, general television broadcasting, satellite television broadcasting, and cable television broadcasting. The number of external input terminals of the video apparatus will be increased in the future. In this respect, the problems mentioned above will be serious.

SUMMARY OF THE INVENTION

It is therefore an object of the present invention is to provide a video signal selected device which makes it easy to recognize a selecting operation for the input external signals.

In order to achieve the above object, there is provided a video signal selecting device for selectively outputting one of a plurality of input video signals to a video display apparatus in accordance with an instruction input, the selecting device comprising: a selector for selectively outputting one signal of the plural video signals; an OSD (On Screen Display) control section for displaying symbol information on uniformly colored background indicating that the selective output is executed on a screen of the video display apparatus; and a control circuit section for controlling the selective output of the selector in accordance with the instruction input, and for detecting a change of the instruction input to start up the OSD control section.

In the thus arranged video signal selecting device, when the current instruction is changed to another instruction, the control circuit section issues a command to the related portions of the device. In response to the command, the OSD control section operates and causes a video display apparatus coupled to an output terminal to which a selected video signal is to be transmitted to display, for example, characters which indicate that the current instruction has been changed to another instruction, on the uniformly colored back-screen of the video display apparatus. At the same time, the selector selects another video signal in accordance with the new instruction, and allows the selected video signal to pass therethrough and reach the output terminal.

Specifically, when another or new instruction is issued in place of the old one, a character chain representative of a change of instruction is displayed on the uniformly colored back-screen, and then the display of the characters is shifted to a display of an image defined by the video signal. Every time the instruction is changed to another, a character chain representative of a change of the instruction is displayed on the back-screen. Therefore, the user can easily know the change of instruction from the display.

The video signal selecting device may further comprises a sync signal separator for separating a sync signal included in each of the video signals, wherein the control circuit section halts the OSD control section when the sync signal is output from the sync signal separator. The halting operation of the control circuit section may be executed after the sync signal output from the sync signal separator in predetermined interval.

In the video signal selecting device thus arranged, when the video signal as instructed passes through the selector and the sync signal separator separates a sync signal from the video signal, the operation of the OSD control section is halted and thereby the display of the characters indicating the instruction change is shifted to a display of an image defined by the video signal.

When the video signal as instructed is not input to the video signal selecting device, the display on the display screen remains unchanged. When seeing this, the user can recognize that no video signal reaches the video signal selecting device.

A color of the displayed symbol information may be different from the color of the displayed background. Thereby, the symbol information is distinguished and easy to read.

In order to achieve the above object, there may be provided a video signal selecting device for selectively outputting one of a plurality of input video signals to a video display apparatus in accordance with an instruction input, disposed in a video apparatus including an OSD control section, the selecting device comprising: a selector for selectively outputting one signal of the plural video signals; and a control circuit section for controlling the selective output of the selector in accordance with the instruction input, and for detecting a change of the instruction input to start up the OSD control section to display symbol information on uniformly colored background indicating that the selective output is executed on a screen of the video display apparatus.

DETAILED DESCRIPTION OF THE PREFERRED EMBODIMENTS

Figure 1:
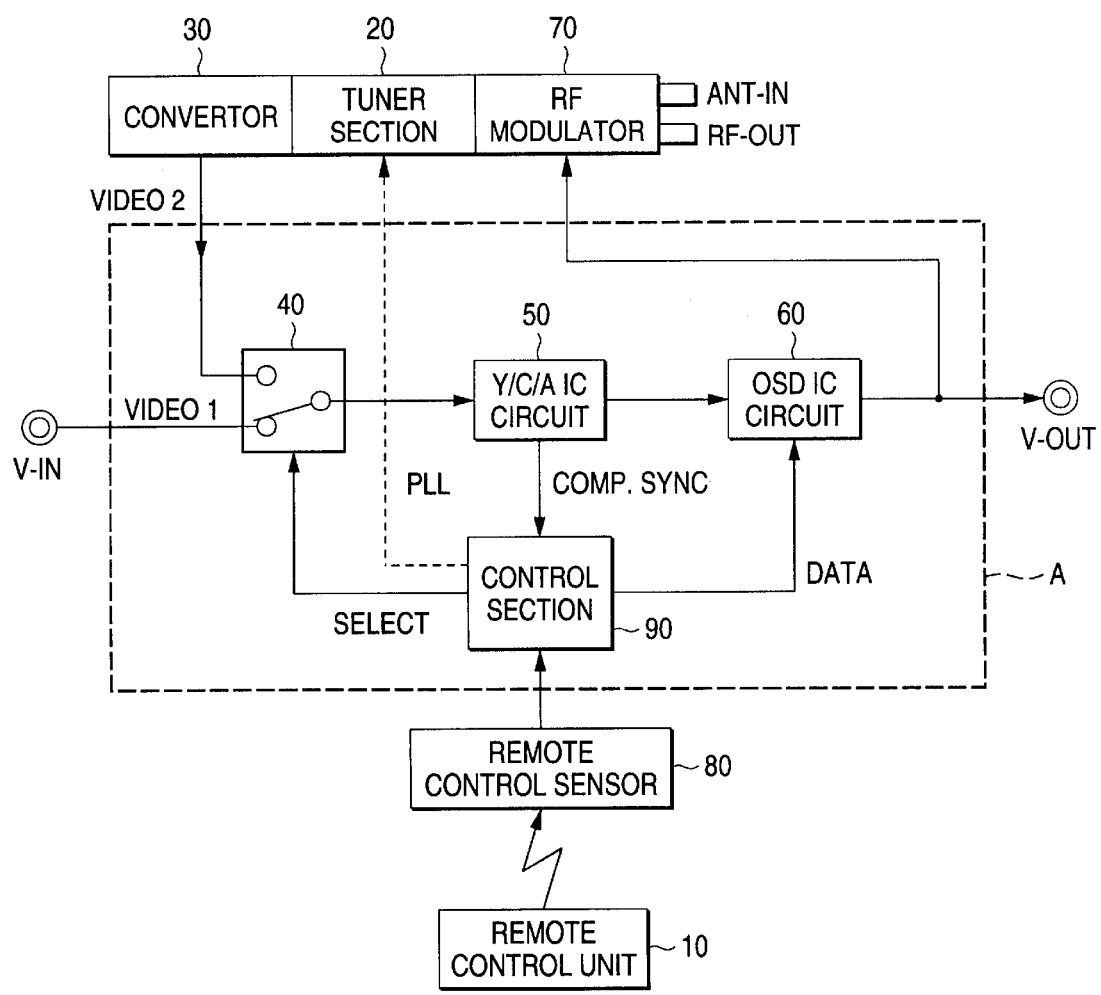
FIG. 1 is a block diagram showing a video signal selecting device incorporated into a video apparatus according to one embodiment of the present invention.
Figure 2:
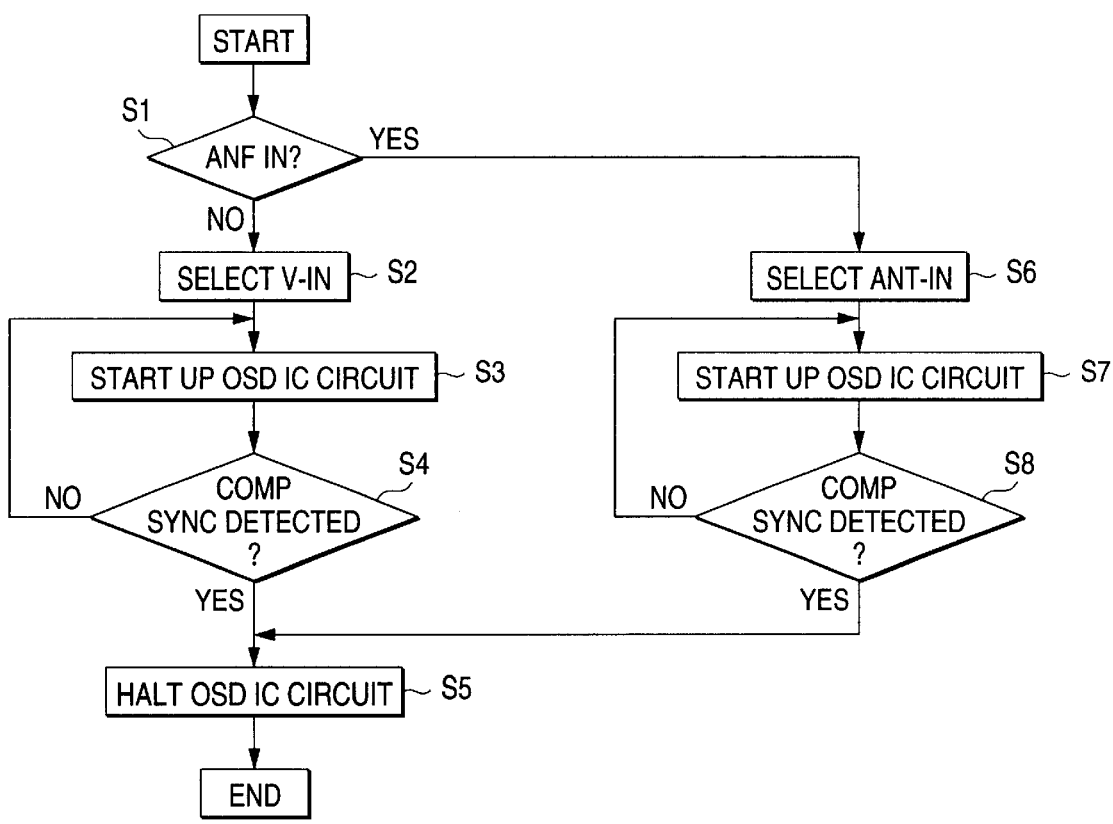
FIG. 2 is a flow chart showing a procedural flow of a program to be executed by a control circuit in the video signal selecting device shown in FIG. 1.

There will be described preferred embodiments of a video signal selecting device incorporated into a video apparatus according to the present invention with reference to the accompanying drawings. FIG. 1 is a block diagram showing a video signal selecting device incorporated into a video apparatus according to one embodiment of the present invention. FIG. 2 is a flow chart showing a procedural flow of a program to be executed by a control circuit in the video signal selecting device shown in FIG. 1.

The video apparatus used in the embodiment is capable of recording video signals to and playing the same back from a magnetic tape (not shown). The video apparatus has a function to display characters indicative of channels on a display screen. The video apparatus is provided with input terminals and output terminals: the input terminals are a video input terminal V-IN and an antenna input terminal ANT-IN, and the output terminals are a video output terminal V-OUT and an RF output terminal RF-OUT.

The video input terminal V-IN is connected to a video device, for example, a video disc, and an antenna for receiving the VHF broadcasting waves. A video display apparatus, for example, a television receiver (TV set), is connected to each of the video output terminal V-OUT and the RF output terminal RF-OUT.

A remote control unit 10 having operation buttons (not shown) is provided for remotely controlling the video apparatus. The remote control unit 10 contains an LED capable of emitting an infrared light beam. When any of the buttons is operated, the LED is driven to emit a light beam, and the emitted light beam is encoded in accordance with a code assigned to the operated button, and the encoded light beam is emitted to the video signal selecting device. Typical examples of the operation buttons are the buttons of record, playback, fast feed, and fast rewind, and further a video signal select button and a channel select button. Operation buttons having the same functions as of the operations buttons of the remote control unit 10 are provided on the front panel of the video apparatus.

A remote control sensor 80 as an infrared LED sensor sensitive to the infrared rays receives an infrared light beam containing operation code information from the remote control unit 10, converts it into an electrical signal, and transmits the converted electrical signal to a control circuit 90.

A tuner 20 is selectively turned to a desired VHF signal from the antenna signal coming in through the antenna input terminal ANT-IN. The receiving frequency of the tuner is controlled by a PLL signal generated by the control circuit 90 to be described later.

Although it is not shown in the figure, an antenna for UHF broadcasting waves is connected to an external antenna input terminal. An antenna signal therefrom is input to the tuner section 20 via a mixer circuit, a local oscillation circuit and others.

A converter 30 is made up of a frequency converter, an intermediate frequency (IF) amplifier and a video detector, and carries out signal processing of intermediate frequency conversion and demodulation, and generates a video signal (VIDEO 2).

The video signal VIDEO 2 is processed by a video signal selecting device A to be described later, and modulated by an RF modulator 70, and the modulated one is applied to the RF output terminal RF-OUT.

The video signal selecting device A, which is incorporated into the video apparatus, generally functions: 1) it selects a video signal VIDEO 1 or a video signal VIDEO 2 (received at the video input terminal V-IN) in accordance with a select signal that the control circuit 90 generates in response to an instruction issued from the remote control unit 10; and 2) it appropriately processes the selected video signal and applies the resultant to the video output terminal V-OUT. The arrangement of the video signal selecting device A will be described hereunder.

As shown, the video signal selecting device A comprises a selector 40, a Y/C/A IC circuit 50, an OSD (On Screen Display) IC circuit 60, and the control circuit 90 already referred to. The selector 40 selects a video signal VIDEO 1 or a video signal VIDEO 2 in accordance with a select signal from the control circuit 90. The OSD IC circuit 60 is arranged between the output of the selector 40 and the video output terminal V-OUT, and displays a chain of characters indicating that the current instruction has been changed to another instruction. Specifically, in the embodiment, a chain of characters, for example, "EXT" or "AUX", is displayed on a back-screen of blue color. In the embodiment, the characters are displayed in white color on the blue back-screen. The Y/C/A IC circuit 50 is arranged between the selector 40 and the OSD IC circuit 60, and separates a sync signal COMP SYNC from the vide signal. The control circuit 90 controls the operations of the selector 40 and the OSD IC circuit 60 in accordance with a signal output from the remote control unit 10 and the sync signal COMP SYNC output from the Y/C/A IC circuit.

A two-input/one-output analog switch is served as the selector 40 in the embodiment. In selecting the video signal VIDEO 1 or the video signal VIDEO 2 by the selector 40, a select signal SELECT generated by the control circuit 90 is served as an instruction for signal selection. The video signal thus selected by the selector 40 is led to the Y/C/A IC circuit 50.

The Y/C/A IC circuit 50 includes at least 1) a function of a signal modulation for recording the video signal received from the selector 40 into a magnetic tape, and 2) a function of a signal demodulation for converting an FM modulation signal, which is read out of the magnetic tape, into a video signal, and 3) a function to extract a color signal, a voice signal, and a sync signal COMP SYNC from the video signal.

The OSD IC circuit 60 displays characters representative of channels on a display screen, and operates in accordance with commands DATA, which are generated by the control circuit 90. The OSD IC circuit 60, when operated, outputs to the video output terminal V-OUT a video signal for displaying a chain of characters, for example, "EXT" or "AUX", on a blue back-screen of a TV set coupled to the video output terminal V-OUT. The OSD IC circuit 60, when not operated, allows the video signal coming from the Y/C/A IC circuit 50 to pass therethrough without executing any processing.

The OSD IC circuit 60 includes a memory containing character data prestored therein. In the embodiment, when a command DATA, generated by the control circuit 90, has the contents to display a chain of characters, for example, "EXT", at a predetermined location on the blue back-screen, the OSD IC circuit 60 generates a video signal to visually present the character chain of "EXT" of white color on the blue back-screen of the TV set in a manner that it generates a signal containing colors R, G and B where emphasis is placed on the color B, scans character data of "EXT" in the memory and superpose the corresponding signal thereon.

The control circuit 90, including mainly a microcomputer, controls the overall operations of the video apparatus in accordance with an instruction, which is issued from the remote control unit 10 when the user operates the buttons thereof. A memory of the microcomputer contains a program for controlling the overall operations of the video apparatus, and programs for controlling the selector 40 and the OSD IC circuit 60. The contents of the program and the operation of the video signal selecting device A will be described.

When the user operates the remote control unit 10 to change the current instruction to another instruction, the control circuit 90 executes an interrupt program shown in FIG. 2. At first, it is determined whether or not the new instruction from the remote control unit 10 designates a video signal coming in through the antenna input terminal ANT-IN at a step S1.

If it is determined the instruction does not designate the video signal from the antenna input terminal ANT-IN (NO at the step S1), a select signal SELECT is generated for instructing the selector 40 to select the video signal VIDEO 1 coming in through the video input terminal V-IN, at a step S2. Thereby the video signal VIDEO 1 passes through the selector 40, and reaches the Y/C/A IC circuit 50.

Subsequently, the controller drives the OSD IC circuit 60 which in turn generates a command DATA to display a chain of characters, for example, "EXT" or "AUX", in white color at the predetermined location on the blue back-screen at a step S3. The OSD IC circuit 60 outputs a video signal for displaying the characters to the video output terminal V-OUT. In this operation mode, the RF modulator 70 is not operated, and hence no output signal appears at the RF output terminal RF-OUT.

The TV set coupled to the video output terminal V-OUT then displays the character chain "EXT" or "AUX" in white color at the predetermined location on the blue back-screen.

Then it is determined whether or not a sync signal COMP SYNC is output from the Y/C/A IC circuit 50 at a step S4. Since the sync signal COMP SYNC is contained in the video signal VIDEO 1 received by the Y/C/A IC circuit 50, the step S4 checks whether or not the video signal VIDEO 1, which is output from a video device, for example, video disc, has actually reached the Y/C/A IC circuit 50.

If it is determined no sync signal COMP SYNC reaches (NO at the step S4), the procedure returns to the step S3 and executes the step S4 again. And a chain of characters "EXT" or "AUX" is displayed in white color the predetermined location on the blue back-screen of the TV set. The displaying of the character chain is continued until the current instruction by the remote control unit 10 is changed to another instruction.

If it is determined the sync signal COMP SYNC reaches (YES at the step S4), the operation of the OSD IC circuit 60 is halted after 1 to 2 seconds elapse at a step S5. Thereby the video signal VIDEO 1 derived from the Y/C/A IC circuit 50 is allowed to pass through the ODD IC circuit 60 and reach the video output terminal V-OUT.

Accordingly, a chain of white characters of "EXT" or "AUX" is displayed on the blue back-screen of the TV set connecting to the video output terminal V-OUT. After 1 to 2 seconds from the display of the character chain, the display on the screen is changed to an image of the video signal output from the video apparatus such as a video disk or the like.

If it is determined that the new instruction issued from the remote control unit 10 designates the antenna input terminal ANT-IN (YES at the step S1), a select signal SELECT is generated at a step 6 for instructing the selector 40 to select the video signal VIDEO 2, which is input from the external antenna input terminal ANT-IN and came through the tuner section 20 and the converter 30. Thereby, step the video signal VIDEO 2 is allowed to pass through the selector 40 and to be input to the Y/C/A IC circuit 50.

Subsequently, the controller drives the OSD IC circuit 60 which in turn generates a command DATA to display a chain of characters, for example, "EXT" or "AUX", in white color at a predetermined location on the blue back-screen at a step S7. The OSD IC circuit 60 outputs a video signal for displaying the characters to the RF output terminal RF-OUT coupled to a TV set.

The TV set coupled to the RF output terminal RF-OUT then displays the character chain "EXT" or "AUX" in white color at the predetermined location on the blue back-screen.

Then it is determined whether or not a sync signal COMP SYNC is output from the Y/C/A IC circuit 50 at a step S8. Since the sync signal COMP SYNC is contained in the video signal VIDEO 1 received by the Y/C/A IC circuit 50, the step S8 checks whether or not the video signal VIDEO 1, which is output from a video device, for example, video disc, has actually reached the Y/C/A IC circuit 50.

If it is determined no sync signal COMP SYNC reaches (NO at the step S8), the procedure returns to the step S7 and executes the step S8 again. And a chain of characters "EXT" or "AUX" is displayed in white color the predetermined location on the blue back-screen of the TV set. The displaying of the character chain is continued until the current instruction by the remote control unit 10 is changed to another instruction.

If it is determined the sync signal COMP SYNC reaches (YES at the step S8), the operation of the OSD IC circuit 60 is halted after 1 to 2 seconds elapse at a step S5. Thereby the video signal VIDEO 1 derived from the Y/C/A IC circuit 50 is allowed to pass through the ODD IC circuit 60 and reach the video output terminal V-OUT via the RF modulator 70.

Accordingly, a chain of white characters of "EXT" or "AUX" is displayed on the blue back-screen of the TV set connecting to the video output terminal V-OUT. After 1 to 2 seconds from the display of the character chain, the display on the screen is changed to an image of the video signal output from the video apparatus such as a video disk or the like. When the processing at the step 5 is terminated, the interrupt program shown in FIG. 2 is also terminated.

As seen from the foregoing description, where the video signal selecting device A is used, when the user operates to change the current instruction to another instruction, a white character chain of "EXT" or "AUX" is displayed on the blue back-screen of a TV set for 1 to 2 seconds. Therefore, the user can readily recognize that the instruction has been changed to another instruction as designated. Further, it is noted that the color of the character chain is different from that of the back-screen. This feature provides a distinguished visual presentation of the character chain of "EXT" or "AUX".

When the blue back-screen display remains unchanged after 1 to 2 seconds elapses, the user can readily recognize that the connection of a cable connecting to the antenna or the video device to the video input terminal V-IN or the antenna input terminal ANT-IN is improper. This feature provides an easy handling of the video apparatus by the user. To achieve the above-mentioned functions, the software loaded into the control circuit 90 is merely changed to another instruction, and there is no need of using an additional hardware to the video apparatus. This feature is meritorious in the performance improvement and cost reduction of the video apparatus.

The video signal selecting device A of the invention may be applied to TV sets capable of receiving general, satellite and cable TV broadcasting, in addition to the video apparatus.

In stead of disposing the OSD IC circuit 60 inside the video signal selecting device A, it may be constituted that a video signal selecting device A' is disposed in a video apparatus such as a TV set, a VTR, or the like, which includes an OSD IC circuit 60', and the function of the OSD IC circuit 60 is substituted by utilizing the OSD IC circuit 60'.

The selector may be designed so as to select a video signal from three or more number of video signals. The OSD IC circuit 60 may take any form of circuitry if it is capable of displaying characters, graphics or symbols, which indicate that the current instruction issued from the remote control unit have been changed to another instruction, on the back-screen uniformly colored. Those characters may be displayed together with the new instruction of "EXT 1" or "EXT 2". While the back-screen is uniformly colored over its entire area in the above-mentioned embodiment, only the area of the back-screen where the characters are to be displayed may be uniformly colored. The functions, which are realized by the software in the control circuit in the above-mentioned embodiment may be realized by a hardware technique.

As has been described heretofore, according to the present invention, every time the current instruction is changed to another instruction, characters indicating a change of the instruction are displayed on a uniformly colored back-screen of a video display apparatus coupled to the output terminal for a predetermined period of time, irrespective of presence or absence of the video signal. The characters displayed are easy to read when comparing with the related device. Further, those characters are displayed even when the video signal is not actually input. Therefore, the instruction change is readily known from the display, and an easy handling of the apparatus is secured.

According to the present invention, the current instruction is changed to another instruction, and characters indicating a change of the instruction are displayed on a uniformly colored back-screen of a video display apparatus. When the video signal is actually input to the video signal selecting device, the character display is shifted to a display of an image defined by the video signal. Therefore, even if the instruction is changed to another, when no video signal is input to the device, the display on the screen remains unchanged. Therefore, when seeing the unchanged display, the user can know that no video signal is received, and hence an easy handling of the apparatus is also secured.

According to the present invention, the color of the characters indicating an instruction change is different from that of the back-screen. The result is that the displayed characters are easy to read, and the instruction change, externally made, is easy to know, and an easy handling of the apparatus is secured.

According to the present invention, if it is constituted that a video signal selecting device is disposed in a video apparatus such as a TV set, a VTR, or the like, which includes an OSD IC circuit and the control section in the device utilizes the OSC IC circuit in the apparatus, there is no need of additionally using the on-screen display control section. This leads to cost reduction. the function of the OSD IC circuit 60 is substituted by utilizing the OSD IC circuit 60'.

What is claimed is:

1. A video signal selecting device for selectively outputting a selected video signal input of a plurality of input video signals to a video display apparatus in accordance with an instruction input from a user, the selecting device comprising:

a selector for selectively outputting one of a video signal input from a video input terminal and a video signal input from an antenna input terminal;

a sync signal separator for extracting a sync signal from the selected video signal input;

an OSD control section for always entirely replacing, when selection takes place, a previously displayed video signal input with a uniformly colored image including symbol information which indicates the selected video signal input;

a control circuit section for controlling the selective output of the selected video signal input by said selector in accordance with the instruction input from the user, and for detecting a change of the instruction input from the user to start up the OSD control section, wherein the control circuit section halts the OSD control section when the sync signal is output from the sync signal separator, after which the selected video signal input is displayed;

wherein the halting operation of the control circuit section is executed after the sync signal output from the sync signal separator; and wherein a color of the displayed symbol information is different from a color of a displayed background.

2. A video signal selecting device as defined in claim 1, wherein said circuit section controls said OSD control section so as to continue to display the uniformly colored background image until the sync signal is outputted from the sync signal separator.

3. A video signal selecting device for selectively outputting a selected video signal input of a plurality of input video signals to a video display apparatus in accordance with an instruction input from a user, disposed in a video apparatus including an OSD control section, the selecting device comprising:

a selector for selectively outputting one of a video signal input from a video input terminal and a video signal input from an antenna input terminal;

a sync signal separator for extracting a sync signal from the selected video signal input;

a control circuit section for controlling the selective output of the selected video signal input by said selector in accordance with the instruction input from the user, to start up the OSD control section for blanking the entire screen to eliminate noise or other signals between a previously displayed video signal input and the selected video signal input and for entirely replacing the previously displayed video signal input with a uniformly colored image including symbol information which indicates the selected video signal input, wherein the control circuit section halts the OSD control section when the sync signal is output from the sync signal separator;

wherein the halting operation of the control circuit section is executed after the sync signal output from the sync signal separator; and wherein a color of the displayed symbol information is different from a color of a displayed background.

4. A video signal selecting device as defined in claim 3, wherein said circuit section controls said OSD control section so as to continue to display the uniformly colored background image until the sync signal is outputted from the sync signal separator.

5. A video signal selecting device for selectively outputting a selected video signal input of a plurality of input video signals to a video display apparatus in accordance with an instruction input from a user, the selecting device comprising:

a selector for selectively outputting one of a video signal input from a video input terminal and a video signal input from an antenna input terminal;

a sync signal separator for extracting a sync signal from the selected video signal input;

an OSD control section for always blanking the entire screen to eliminate noise or other signals between a previously displayed video signal input and the selected video signal input, and entirely replacing, when selection takes place, the previously displayed video signal input with a uniformly colored image including symbol information which indicates the selected video signal input;

a control circuit section for controlling the selective output of the selected video signal from said selector in accordance with the instruction input from the user, and for detecting a change of the instruction input from the user to start up the OSD control section, wherein the control circuit section halts the OSD control section when the sync signal is output from the sync signal separator, after which the selected image video signal input is displayed;

wherein the halting operation of the control circuit is executed after the sync signal output from the sync signal separator; and wherein a color of the displayed symbol information is different from a color of a displayed background.

6. A video signal selecting device for selectively outputting a selected video signal input of a plurality of input video signals to a video display apparatus in accordance with an instruction input from a user, disposed in a video apparatus including an OSD control section, the selecting device comprising:

a selector for selectively outputting one of a video signal input from a video input terminal and a video signal input from an antenna input terminal;

a sync signal separator for separating a sync signal from the selected video signal input;

a control circuit section for controlling the selective output of the selected video signal input from the selector in accordance with the instruction input from the user, and for detecting a change in the instruction input from the user to start up the OSD control section for always blanking the entire screen to eliminate noise or other signals between a previously displayed video signal input and the selected video signal input and for entirely replacing the previously displayed video signal input with a uniformly colored image including symbol information which indicates the selected video signal input;

wherein the control circuit section halts the OSD control section when the sync signal is output from the sync signal separator;

wherein the halting operation of the control circuit section is executed after the sync signal output from the sync signal separator; and wherein a color of the displayed symbol information is different from a color of a displayed background.

* * * * *